United States Patent
Kollipara (10) Patent No.: US 10,063,431 B1
(45) Date of Patent: Aug. 28, 2018

(54) DETECTING AND REPORTING THE IMPACT OF HANDOVERS ON SUBSCRIBER QUALITY OF EXPERIENCE

(71) Applicant: NetScout Systems, Inc, Westford, MA (US)

(72) Inventor: Anilkumar Kollipara, Allen, TX (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 15/708,009

(22) Filed: Sep. 18, 2017

Related U.S. Application Data (60) Provisional application No. 62/479,710, filed on Mar. 31, 2017.

(51) Int. Cl.
| | |
|---|---|
| *H04L 12/24* | (2006.01) |
| *H04W 24/08* | (2009.01) |
| *H04W 36/00* | (2009.01) |
| *H04W 36/30* | (2009.01) |

(52) U.S. Cl.
CPC ......... *H04L 41/5009* (2013.01); *H04W 24/08* (2013.01); *H04W 36/0088* (2013.01); *H04W 36/0094* (2013.01); *H04W 36/30* (2013.01)

(58) Field of Classification Search
CPC .............. H04L 41/5009; H04W 24/08; H04W 36/0094; H04W 36/0088; H04W 36/30
See application file for complete search history.

(56) References Cited

U.S. PATENT DOCUMENTS

| | | | | |
|---|---|---|---|---|
| 7,570,616 | B2* | 8/2009 | Henrikson | H04W 36/0066 370/328 |
| 9,402,218 | B1* | 7/2016 | Jamshidi | H04W 36/24 |
| 9,736,700 | B1* | 8/2017 | Douberley | H04W 16/18 |
| 2008/0004035 | A1* | 1/2008 | Atkins | H04L 41/142 455/454 |
| 2011/0153808 | A1* | 6/2011 | Byun | H04W 24/02 709/224 |
| 2012/0188882 | A1* | 7/2012 | Wilkinson | H04L 41/5067 370/252 |
| 2013/0163438 | A1* | 6/2013 | Wilkinson | H04L 43/50 370/242 |
| 2014/0370886 | A1* | 12/2014 | Lisak | H04W 36/0022 455/552.1 |

(Continued)

*Primary Examiner* — Rina C Pancholi
(74) *Attorney, Agent, or Firm* — Locke Lord LLP; Scott D. Wofsy; Christopher J. Capelli (57) ABSTRACT

A method for monitoring, detecting and reporting the impact of handovers on the quality of experience for one or more users in a mobile cellular network includes collecting, from a plurality of mobile network elements, session records specifying data about sessions handled by two or more mobile network elements. A session record comprises a signaling portion and a media portion. Each session includes two or more session segments. Session segments having session media gaps are identified from the media portions of the collected session records. At least some of the session media gaps are associated with a handover procedure between two mobile network elements. A plurality of performance metrics related to handover procedures in the identified session segments are calculated and stored. An interactive graphical representation of the stored performance metrics is rendered to a user via a graphical user interface.

7 Claims, 6 Drawing Sheets

(56) References Cited

U.S. PATENT DOCUMENTS

| | | | |
|---|---|---|---|
| 2015/0289168 A1* | 10/2015 | Jafry | H04W 36/0005 |
| | | | 455/436 |
| 2016/0065419 A1* | 3/2016 | Szilagyi | H04L 41/5067 |
| | | | 709/224 |
| 2016/0150455 A1* | 5/2016 | Suryavanshi | H04W 36/245 |
| | | | 455/436 |
| 2018/0049071 A1* | 2/2018 | Xu | H04W 36/0022 |

* cited by examiner

DETECTING AND REPORTING THE IMPACT OF HANDOVERS ON SUBSCRIBER QUALITY OF EXPERIENCE

CROSS REFERENCE TO RELATED APPLICATIONS

This application claims priority under 35 U.S.C. § 119 from U.S. Provisional Application No. 62/479,710, entitled "Detecting and Reporting the Impact of Handovers on Subscriber Quality of Experience", filed on Mar. 31, 2017.

FIELD OF THE INVENTION

Embodiments of the present invention relate to network monitoring and, more particularly, to a system and method for detecting and reporting the impact of handovers on subscriber Quality of Experience (QoE) and ranking handover vectors for optimization in VoLTE and VOIP networks.

BACKGROUND OF THE INVENTION

Network monitoring and customer experience monitoring solutions are widely accepted standards for the operations of carrier service provider networks across both fixed networks (e.g., Cable/MSO, IP broadband such as DSL, FITH, etc.) and mobile networks (e.g., 2.5 G, 3 G, LTE, etc.). These systems monitor network traffic via probe devices that collect user and control plane signaling from telecommunication networks, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business processes.

A few examples of KPIs include Handover Success (by node, location, etc.), Call Drop Ratio (by node, handset, etc.), Application Usage (by node, subscriber, etc.), Subscriber Count (by location, demographic, etc.), and the like.

Quality of Experience (QoE) is a measure of customer's experiences using mobile network services. QoE takes into account the needs and the desires of the subscribers when using a mobile service. For example, an operator may provide reliable data services corresponding to high Quality of Service values, (QoS), but the users may still perceive a low QoE. Since majority of communication problems happen in the radio access network (i.e. RAN) of communication networks, these QoS reports typically do not factor in the impacts of a poor RAN performance due to cell congestion or coverage.

In some wireless communication networks, failures in establishing or maintaining network connection may result in significant degradations in wireless communication performance and quality. Further, in such scenarios, limitations may exist in remedying the degradations. Thus, improvements in handover procedures are desired. Current performance monitoring, optimization and reporting solutions measure the quality of base station handover procedures (e.g., Base Transceiver Station (BTS) handover procedures) based on various levels of network measures of the underlying handover signaling procedures associated with a device, such as perhaps total network handover success, network failures, timeouts or latency metrics. Many of these existing methods and metrics do not necessarily indicate the impact of handovers on the subscriber QoE.

Accordingly, it would be advantageous to provide a more accurate method of detecting and reporting the impact of handovers on subscribers' QoE in a wireless telecommunication network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for monitoring, detecting and reporting the impact of handovers on the quality of experience for one or more users in a mobile cellular network includes collecting, from a plurality of mobile network elements, session records specifying data about sessions handled by two or more mobile network elements. A session record comprises of a signaling portion and a media portion. Each session includes two or more session segments. Session segments having session media gaps are identified from the media portions of the collected session records. At least some of the session media gaps are associated with a handover procedure between two mobile network elements. A plurality of performance metrics related to handover procedures in the identified session segments are calculated and stored. An interactive graphical representation of the stored performance metrics is rendered to a user via a graphical user interface.

In another aspect, a network device for monitoring, detecting and reporting the impact of handovers on the quality of experience for one or more users in a mobile cellular network is provided. The network device is configured to collect, from a plurality of mobile network elements, session records specifying data about sessions handled by two or more mobile network elements and configured to identify one or more session segments having one or more session media gaps from the collected session records. Each session record comprises a data portion and a media portion. Each session includes two or more session segments. The network device is also configured to identify one or more session segments having one or more session media gaps from the media portions of the collected session records. At least some of the session media gaps are associated with a handover procedure between a first and second mobile network element. The network device is further configured to calculate and store a plurality of performance metrics related to the handover procedures in the identified session segments and to render to a user an interactive graphical representation of the stored performance metrics via a graphical user interface.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Figure 1:
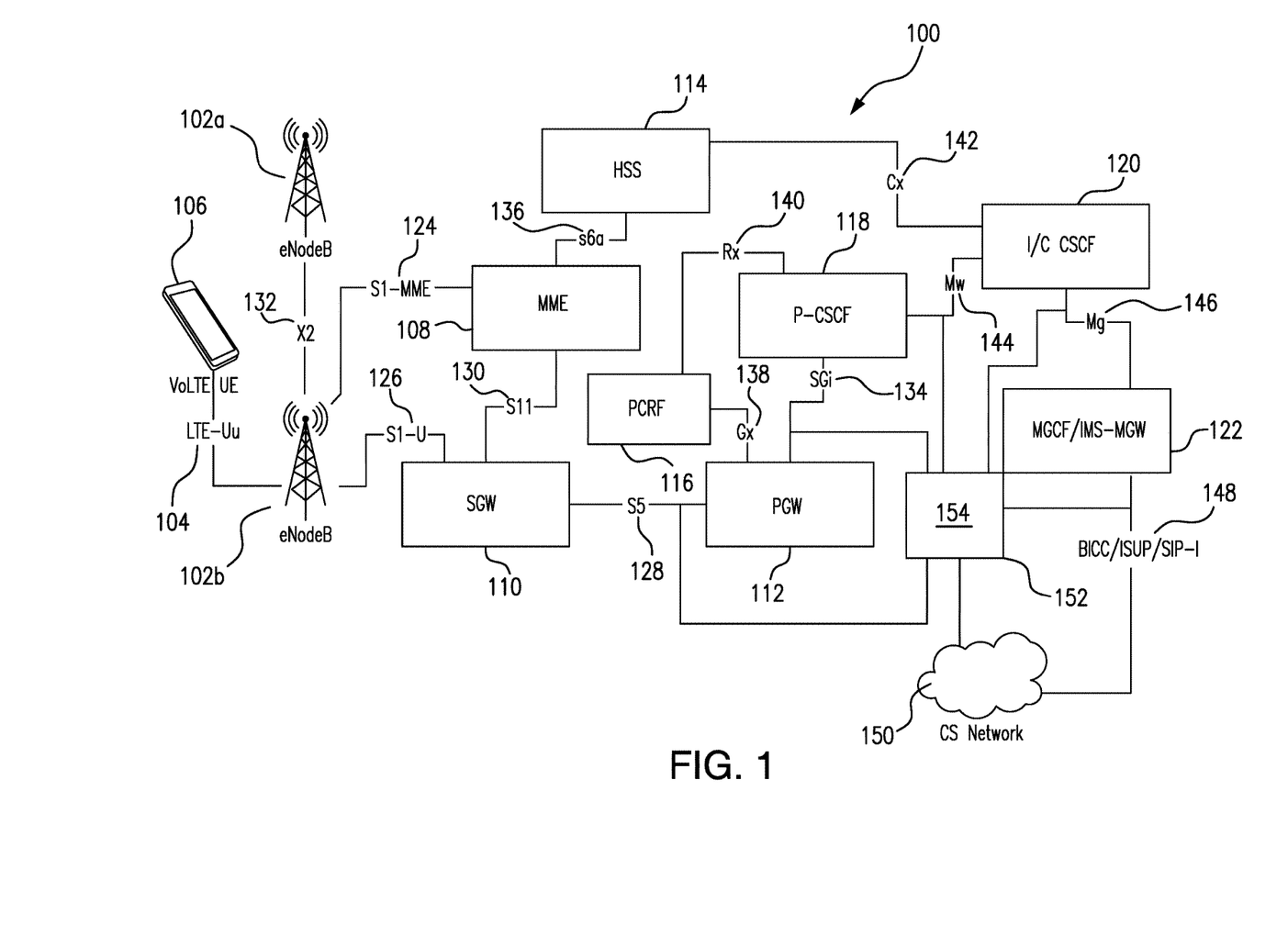
FIG. 1 illustrates an example communication network in accordance with an illustrated embodiment.

FIG. 1 illustrates the architecture of a system for performance monitoring of Voice over LTE (VoLTE) networks, in which an embodiment of the present invention may be implemented. It is noted that the VoLTE system of FIG. 1 is merely one example of a possible VoIP system, and embodiments may be implemented in any of various systems, as desired.

As shown, the exemplary LTE system includes one or more eNodeBs 102a, 102b which communicates over a transmission medium (LTE Uu interface 104) with one or more user devices 106. User devices may be referred to herein as "user equipment" (UE). Thus, the user devices 106 are referred to as UEs or UE devices. UE devices 106 may comprise any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Access network 100 may include one or more eNodeBs 102a and 102b (corresponding to respective base stations not shown in FIG. 1), a mobility management entity (MME) 108, a serving gateway (SGW) 110, a packet data network gateway (PGW) 112, a home subscriber server (HSS) 114, among other component. While FIG. 1 depicts a couple of eNodeBs 102a and 102b and a single MME 108, SGW 110, PGW 112, HSS 114, among other components, for illustration purposes, in other implementations, FIG. 1 may include more than two eNodeBs 102a and 102b, as well as multiple MMEs 108, SGWs 110, PGWs 112, HSSes 114, etc. eNodeBs 102a and 102b may include one or more devices (e.g., base stations) and other components and functionality that allow UE 106 to wirelessly connect to access network 100. eNodeBs 102a and 102b may include or be associated with one or more cells. For example, each cell may include a radio frequency (RF) transceiver facing a particular direction. The video stream and the VoLTE call are carried as radio transmissions along LTE-Uu links 104, over which UE devices 106 are attached to one or more cells. eNodeBs 102a and 102b may interface with access network 100 via an interface referred to as an S1 interface, which may be split into a control plane S1-MME interface 124 and a data plane S1-U interface 126. S1-MME interface 124 may interface with MME device 108. S1-MME interface 124 may be implemented, for example, with a protocol stack that includes a Network Access Server (NAS) protocol and/or Stream Control Transmission Protocol (SCTP). An S1-U interface 126 may interface with SGW 110 and may be implemented, for example, using a General Packet Radio Service Tunneling Protocol version 2 (GTPv2).

MME 108 may implement control plane processing for access network 100. For example, MME 108 may implement tracking and paging procedures for UE 106, may activate and deactivate bearers for UE 106, may authenticate a user of UE 106, and may interface to non-LTE radio access networks. A bearer may represent a logical channel with particular quality of service (QoS) requirements. MME 108 may also select a particular SGW 110 for a particular UE 106. A particular MME 108 may interface with other MMEs in access network 100 and may send and receive information associated with UEs 106, which may allow one MME device to take over control plane processing of UEs serviced by another MME, if the other MME becomes unavailable.

SGW 110 is part of the wireless relay which comprises eNodeBs 102a and 102b, Serving Gateway (SGW) 110, Packet Data Security Gateway (PGW) 112 and Policy and Charging Rules Function (PCRF) 116. SGW 110 routes and forwards user data packets. SGW 110 acts as the mobility anchor for the user plane during inter-eNodeB 102a and 102b handovers. PGW 112 and SGW 110 communicate over an LTE S5 link 128. As noted above, SGW 110 and eNodeB 102a and 102b communicate over an LTE S1-U link 126. SGW 110 and MME 108 communicate over an LTE S11 link 130.

According to an embodiment of the present invention, the disclosed monitoring system and method intercepts VoLTE signals when a proxy-call session control function (P-CSCF) 116 and interrogating/serving-call session control function (I/S-CSCF) 120 services are provided by a single device without an exposed link which could be monitored. VoLTE signals include IP Multimedia Subsystem (IMS) signaling (SIP) and media (RTP) bearers. PGW 112 provides connectivity between the UE devices 106 and external packet data networks. In a network, multiple PGWs 112 may handle different application traffic types. The IMS PGW 112 is the path to reach the IMS components, such as the P-CSCF 118 or S-CSCF, which is the call session control function that does voice switching.

The IMS may be generally described as architecture for delivering multimedia services to the UEs 106 using the IP protocol. The IMS may include a variety of components to accomplish this task. For example, a typical IMS includes a Home Subscriber Server (HSS) 114 that stores subscription information for a user of the UEs 106. Thus, when the corresponding UE of the user registers with the IMS (e.g., connects thereto), the subscription information may be utilized to determine various features. For example, this subscription information is used to provide the correct multimedia services to the user such as a VoLTE call. The IMS may communicate with the cellular core network 150 and the Internet (not shown in FIG. 1) to provide the multimedia services to the UEs 106.

The PCRF 116 may determine policy rules in the IMS. The PCRF 116 aggregates information to and from the IMS to support creation of the rules and make policy decisions for the multimedia services performed by the UE 110. With particular regard to the VoLTE call functionality, the PCRF 116 may be a mediator of network resources for the IMS to establish the call and allocate the requested bandwidth to the dedicated bearer.

With specific regard to the VoLTE call functionality, the IMS registration procedure may incorporate the PCRF 116 and the P-CSCF 118. The P-CSCF 118 may be a SIP proxy providing a first point of contact for the UE 106 with the IMS. The P-CSCF 118 may also be disposed on a path of all signaling to inspect each signal ensuring that the UE 106 does not misbehave such as changing a known signaling route or disobeying a routing policy. PGW 112 and P-CSCF 118 communicate over an LTE SGi link 134. Gm reference interface is tunneled within SGi interface 134 for VoLTE services. The Gm interface is used to exchange messages between SIP UE 106 and P-CSCF 118.

UEs 106 can register with the IMS network by contacting the P-CSCF 118 which communicates with the I/C-CSCF 120, which in turn, communicates with a Serving CSCF (S-CSCF) to register the UEs 106 with the HSS 114. To initiate a communication session between UEs, an originating IMS UE 106 can submit a Session Initiation Protocol (SIP INVITE) message to an originating P-CSCF 118 which communicates with a corresponding originating S-CSCF. The originating S-CSCF can submit the SIP INVITE message to one or more application servers (ASs) that can provide a variety of services to IMS subscribers.

Media Gateway Control Function/IMS Media Gateway (MGCF/IMS-MGW) 122 is responsible for the control/media plane internetworking at the network interconnect point to circuit-switched networks. This includes interworking to CS networks 150 based on BICC/ISUP/SIP-I 148. The MGCF 122 forwards VoLTE session invitation to a subscriber via the CS network 150.

The X2 interface 132 is a defined interface for providing point-to-point communications between two eNodeBs 102a and 102b within LTE radio access network 100. The X2 interface 132 supports the exchange of signaling information and also supports the forwarding of packets from one eNodeB 102a to another eNodeB 102b via a tunnel. The X2 interface 132 is used by an X2 application protocol, which supports many applications, including mobility management (e.g., handovers); load management; reporting of general error situations; resetting X2; setting up X2; and eNodeB configuration updates.

The S6a interface 136 is used by the MME 108 to retrieve subscriber data from the HSS 114.

The PCRF 116 manages Gx sessions 138 between the PGW 112 and the PCRF 116, and manages Rx sessions 140 between the P-CSCF 118 and the PCRF 116. Gx sessions 138 typically tend to be long-lived sessions. However, the PCRF 116 may experience a Gx session 138 loss due to, for example, software failure, geo-redundancy recovery, etc. associated with the PCRF 116. The PCRF 116 may also experience a message loss, such as, for example, a reauthorization request being dropped due to overload control, message buffer overflow, etc. During the session loss and/or the message loss, the PCRF 116 and the PGW 112 are unable to synchronize session state (e.g., policy control and charging rules status, quality of service (QoS), event triggers, access point name (APN)-aggregate maximum bit rate (AMBR), etc.). This, in turn, results in a poor user experience when a user is attempting to establish voice and/or video calls. For example, the PCRF 116 cannot process an Rx 140 request for a voice/video call when the PCRF 116 has lost state for a corresponding Gx session 138. This may require the user to power cycle the UE 106 or to drop and recreate a Gx connection 138 to establish the voice/video call.

The Cx interface 142 is between the I/C-CSCF 120 and the HSS 114. The Cx interface 142 may be used at the I/C-CSCF element 120 to query the HSS 144 for which S-CSCF element should handle the MSISDN if the user is IMS/VoLTE provisioned. Therefore, the result of this query would indicate whether a MSISDN is provisioned for VoLTE service.

The IMS core interfaces are the Mw interface 144 between the P-CSCF 118 and the I/C-CSCF 120 and the Mg interface 146 between the I/C-CSCF 120 and the MGCF 122.

Core network 150 connectivity is simplified by the introduction of BICC/SIP/SIP-I (Bearer Independent Call Control/Session Initiation Protocol/SIP-with Encapsulated ISUP) and SIGTRAN (MAP) interfaces 148.

Quality monitoring is an important operational scheme for service providers. In a wireless telecommunications network, such as wireless network 100, QoE is a measure of customers' experiences using mobile services. QoE takes into account the needs and the desires of the subscribers when using a mobile service. For example, an operator may provide reliable data services corresponding to high QoS, but the users may still perceive a low QoE. This phenomenon may be explained by the fact that QoS statistics are typically measured by a monitoring point in the core network 150. However, core network 150 typically has very few data transport issues. The traditional network measures do not identify the problem base station (e.g., eNodeB) pairs that are negatively impacting subscriber experience.

Advantageously, various embodiments of the present invention contemplate a quality monitoring system that timely and accurately detects, evaluates and reports the impact of handovers on the QoE. According to an embodiment of the present invention, this quality monitoring system may include, but not limited to, a server for monitoring data communication at various locations or links of the network 100. A plurality of media communication sessions including data transfer sessions, Voice-over-IP (VoIP) and video communication (including video on demand) and streaming audio and video sessions, such as, but not limited to, interactive video conferencing sessions may be transmitted across the network 100.

As shown in FIG. 1, a media session quality analyzing server 152 may be communicatively connected to the network 100. In an embodiment of the present invention, the media session quality analyzing server 152 may comprise, or otherwise may cooperate with a handover monitor software program 154. Handover monitor 154 may comprise program instructions stored on one or more computer-readable storage devices, which may include internal storage on the quality analyzing server 152. Handover monitor 154 may be, for example, a computer program or program component capable of capturing certain quality related information with respect to handover procedures, in real time. The handover monitors 154 are hardware, software, firmware or a combination thereof for monitoring data communication at various locations or links of the network 100. Each of the handover monitors 154 may be deployed at certain locations or links of the network 100 to collect network data packets traversing the locations or links.

Figure 2:
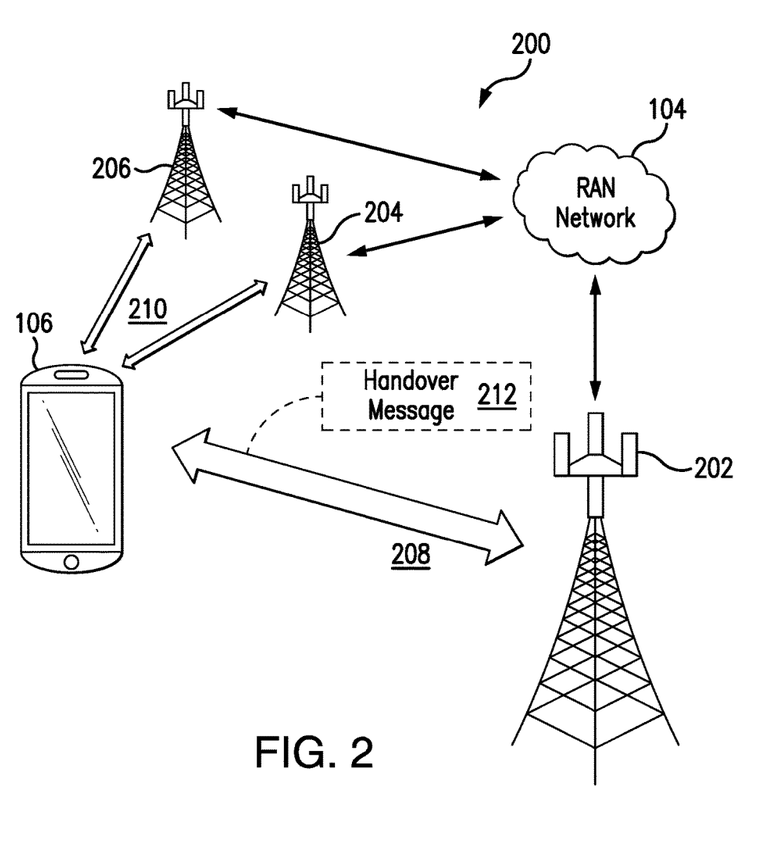
FIG. 2 is a schematic diagram of a communication network including an aspect of a user equipment and network element that may perform handover procedure.

Referring now to FIG. 2, the wireless communication system 200 includes at least one UE 106 in communication coverage of at least a source network element 202 of a first radio access technology (RAT) (e.g., LTE), a first target network element 204 of a second RAT (e.g., time division-synchronous code division multiple access (TD-SCDMA)) and a second target network element 206 of the second RAT. UE 106 may communicate with RAN network 104 by way of, for instance, source network element 202. As such, in an embodiment, the UE 106 may have an established call and/or be in a connected mode with the source network element 202. In some embodiments, the first target network element 204 and second target network element 206 may be connected to the RAN network 104 and/or any other network that may facilitate communication with UE 106.

UE 106 may communicate with the source network element 202 via one or more communication channels 208 and utilizing one or more RATs (e.g., LTE). Additionally, UE 106 may communicate with the first target network element 204 and the second target network element 206 via one or more communication channels 210 and utilizing one or more RATs. In such embodiments, the one or more communication channels 208 and/or one or more communication channels 210 may enable communication on one or both the uplink and downlink between the UE 106 and the source network element 202, first target network element 204 and/or second target network element 206, respectively.

Additionally, in a non-limiting case, the UE 106 may be capable of communicating with network element, such as source network element 202 supporting overlay technologies (e.g., LTE) or alternatively, when such communications are not suitable or are insufficient, with time division technologies (e.g., TD-SCDMA). Further, in such cases, handover among cells and/or associated frequencies may be based on measurement/frequency information received by network element (e.g., source network element 202) from one or more UEs (e.g., UE 106).

That is, the source network element 202, or the RNC element 110 (shown in FIG. 1) associated with the second RAT may use measurement information provided (e.g., periodically) by the UEs in communication coverage, or heuristically based information (e.g., historical handover information), to facilitate handover from a serving network element (e.g., source network element 202) of first RAT to at least one target network element (e.g., first target network element 204 and/or second target network element 206) of second RAT.

According to embodiments of the present invention, the UE 106 may include handover component (not shown in FIG. 2), which may be configured to facilitate handover from the source network element 202 of a first RAT to one of the first target network element 204 of the second RAT or the second target network element 206 of the second RAT. In such embodiment, the first RAT may communicate according to LTE. Additionally, the second RAT may communicate according to TD-SCDMA. For example, the handover component may conduct or otherwise attempt to conduct handover to one or more target network element selected from a list of more than one target network elements. In other words, the handover component may receive handover message 212, including a target network element list that includes more than one target network element, from the source network element 202 and conduct a handover procedure based thereon.

Figure 3:
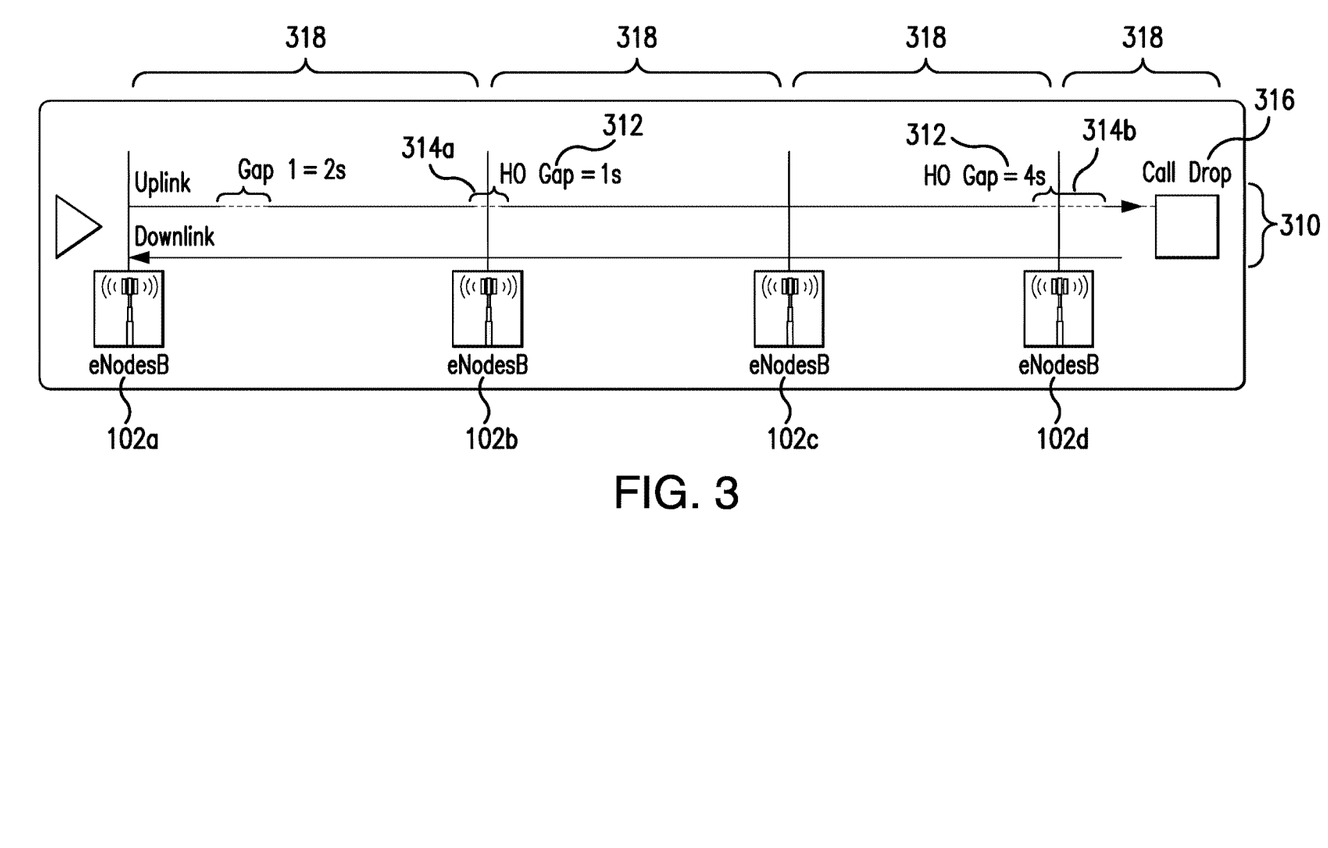
FIG. 3 is another schematic diagram of exemplary monitoring of call handover between various network elements.

As noted above, the existing monitoring methods and metrics do not necessarily provide the impact of handovers on the subscriber quality of experience. Consider an example call as shown in the FIG. 3, where a user of a communications device (e.g., UE 106) makes a phone call while driving on a road. The communications device may be at first connected to a wireless communication system (such as network 100 or wireless network 200 shown in FIGS. 1 and 2, respectively) through a wireless connection to an antenna of a first eNodeB (or Node B) 102a communicating with the network via a communications connection. As the user continues to travel, the call is handed over from the first eNodeB 102a to a second eNodeB 102b to a third eNodeB 102c to a fourth eNodeB 102d. For illustrative purpose only assume the call is finally finished/dropped on the fourth eNodeB 102d. By looking at just the signaling messages 310, it is possible for the monitoring system to determine if the handovers were successful, and if the handover latency 312 was acceptable. In this example, the handovers between at least some of the respective base stations (e.g., handovers between the first eNodeB 102a and the second eNodeB 102b, the second eNodeB 102b and the third eNodeB 102c, and the third eNodeB 102c and the fourth eNodeB 102d) were successful, though some introduced perceivable media/audio gaps 314a and 314b during the process. Traditional handover monitoring methods used by a monitoring system for QoE verification to measure user's QoE KPIs would show the call had three successful handovers. Furthermore, the traditional user plane or media QoE KPIs would show that the call had a total of three gaps but they would not show that the handover process introduced some of the media/audio gaps 314a and 314b, and would not show that the media gap during the last handover 314b probably resulted in a call drop 316 (actual drop or user triggered call termination due to a media gap). Therefore, the aforementioned traditional measures do not identify the problem eNodeB pairs that are negatively impacting subscriber experience, resulting in poor subscriber satisfaction, increased Mean Time To Repair (MTTR) measures and higher operational expenditures (OPEX) costs.

Figure 4:
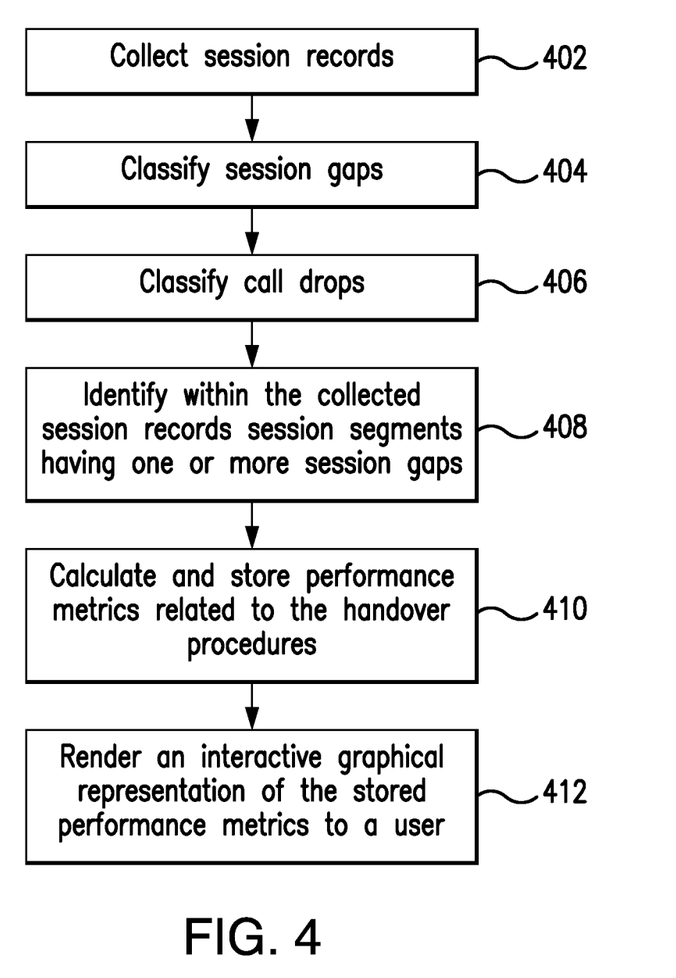
FIG. 4 is a flowchart of operational steps carried out by the quality analyzing system of FIG. 1, in accordance with an illustrative embodiment of the present invention.

FIG. 4 is a flowchart of operational steps of the handover monitor software program 154 of FIG. 1, in accordance with exemplary embodiments of the present invention. Before turning to description of FIG. 4, it is noted that the flow diagram shown therein is described, by way of example, with reference to components shown in FIGS. 1-3 and 5, although these operational steps may be carried out in any system and are not limited to the scenario shown in the aforementioned figure. Additionally, the flow diagram in FIG. 4 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

The handover monitor 154 may generally be a software application comprising one or more modules that monitors, detects and reports the impact of handovers on the end-to-end QoE of communications sessions within the communication network (e.g., communications network 100). In one embodiment, such sessions may comprise streaming video sessions. At 402, the handover monitor 154 preferably receives and analyzes information provided by one or more soft probes deployed in the communication network. In one embodiment, the core network 150 may comprise a Content Delivery Network (CDN). In such embodiment, the soft probes are configured to monitor multiple streams of video content sent over the network 100. The exemplary data received by the handover monitor 154 may include information related to sessions that occur between a unique client device 106 and one of the servers in the CDN network 150. For example, video asset URI, which typically contains video asset name or title, is the key that can be used to join related video downloading segments into a holistic session, so that various performance related KPIs across multiple CDN servers can be viewed and analyzed together. In addition, the handover monitor 154 may use end user UE IP addresses for correlation purposes. It is noted that HTTP-based streaming video sessions are always initiated by the user's UE 106, for example, by issuing a HTTP get request to one of the CDN servers of the CDN network 150. The IP address of such UE 106 remains the same throughout the given video session.

Next, at step 404, the handover monitor 154 performs classification of media session gaps associated with each media transmission session (e.g., video call sessions) for a pre-determined number N of calls/sessions. Each session record includes a data portion and a media (signaling) portion. Each transmission session may include a plurality of base station media segments (denoted as 318 in FIG. 3). At least some of the media gaps may be classified as gaps associated with a handover request message (referred to hereinafter as "handover gaps") based on the media portion of the received session records. It should be noted that, generally, some sessions might have only one segment. However, such sessions are not analyzed by the handover monitor 154 because it is interested in identifying media gaps related to handover request messages. In one embodiment, for a particular media segment 318, if the start time of its first media gap is earlier than the start time of that media segment then that media gap is classified by the handover monitor 154 as a handover gap. It should be noted the handover monitor 154 determines the start time of that base station media segment by the timestamp of the first packet seen on that base station.

At step 406, the handover monitor 154 performs classification of monitored telephone call drops. In various embodiments, at least some of the drops may be classified as call drops caused by the handover procedure. In one embodiment, by way of example, if the handover monitor 154 determines that a particular base station media segment 318 has a handover gap as determined in step 404, and a corresponding session terminated within a user-configurable threshold (e.g., x seconds of that handover gap), then the handover monitor 154 may classify that session termination as a call drop caused by the handover procedure. In addition, in this embodiment, the handover monitor 154 may monitor a call state of the UE device 106, a user interface state, IP Multimedia Subsystem (IMS) Session Initiation Protocol (SIP) messages, UE device 106 handovers, Real-Time Transport Protocol (RTP) statistics, call settings, signal data, radio band data, location data, timestamps, and device data. In some embodiments, the handover monitor 154 may create the operation logs monitoring the operations of the UE device 106. By way of example, the handover monitor 154 may utilize RTP cause codes and cause codes from correlated SIP messages to classify a particular session termination as a failure caused by the handover gaps.

According to an embodiment of the present invention, at step 408, the handover monitor 154 can monitor when specific base station media segments 318 result in media gaps using the enhanced classification performed in steps 404 and 406.

At 410, the handover monitor 154 aggregates and stores performance metrics related to the handoff-related quality degradations (e.g., QoS awareness). In one embodiment, for each eNodeB handover, the handover monitor 154 aggregates the handover gap and call drop metrics over time and stores them as eNodeB handover pairs/vectors. These eNodeB handover vectors enable presentation of handoff-related quality degradation data with far more flexibility and expressiveness than ordinary QoS related KPIs. Advantageously, in this embodiment, the handover monitor 154 may use novel and enhanced KPIs that may measure the performance of a specific network element during handovers. Alternatively, the handover-related KPIs may also provide high level aggregated performance measurements for multiple network elements, for particular pairs/classes of network elements, and/or so forth. These KPIs may identify and quantify the media gaps that were introduced during handovers with specifics on which base stations pairs were involved in each handover along with the relevant gap metrics. In one embodiment, the non-limiting list of enhanced user QOE or network KPIs that may be aggregated at step 410 by the handover monitor 154 include handover gap count metric, handover gap size metrics (e.g., handover gap Large, handover gap Medium, handover gap Small, handover gap X-Small based on configurable bin sizes), a handover gap length metric, a handover gap duration ratio metric, handover gap per handovers metric, a handover gaps per minute metric and a handover gap to total gap ratio metric.

Next, at 412, the handover monitor 154 renders an interactive graphical representation of the stored handover-related performance metrics to a user.

Figure 5:
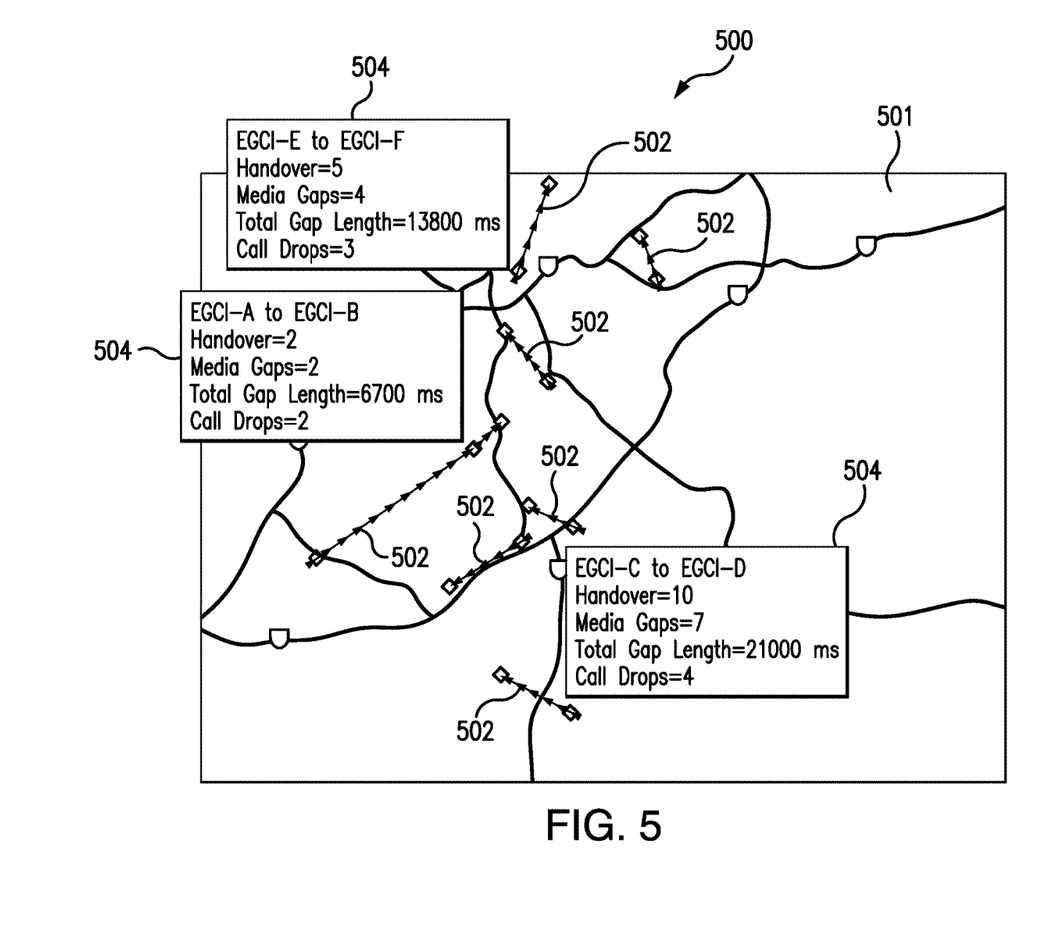
FIG. 5 shows an interactive graphical representation of the stored performance metrics, in accordance with an illustrative embodiment of the present invention.

FIG. 5 shows an interactive graphical representation of the stored performance data associated with a plurality of observed handover procedures, according to one embodiment. The exemplary graphical representation 500 shows a plurality of vector graphic objects 502 positioned between pairs of respective base stations and provide all the relevant aggregated statistics 504. The vector graphic objects 502 are presented over a geographical map 501 representing geo-locations of the respective elements in a network during handoff. It should be noted that the direction of each vector graphic object 502 represents the actual direction of the corresponding handover procedure (e.g., intra-LTE handover from network element 1 to network element 2). In one embodiment, the graphical representation 500 can have a configurable theme to indicate and prioritize best and/or worst base station handover pairs based on user-configurable criteria. For example, the handover monitor 154 may be configured to selectively vary particular attributes (e.g., thickness) of each vector graphic object 502 based on the number and size of certain handover-related statistics (e.g., total gap counts, total gap length, total call drops, etc.).

In summary, various embodiments of the present invention describe a novel media session monitoring approach that may enable to monitor the use of specific allocated network resources on real-time basis and off-load and may allow monitoring specific handover relations that are negatively impacting subscribers and prioritize actions to resolve the issues. The graphical representation 500 of the handover gaps helps optimizing direct communication links between pairs of the network elements involved in handover procedures. These new measures help to provide a source of and to prioritize problem areas and help to improve sophisticated network traffic analysis to reduce MTTR, increase network quality, increase subscriber satisfaction that, in turn, improves customer churn.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
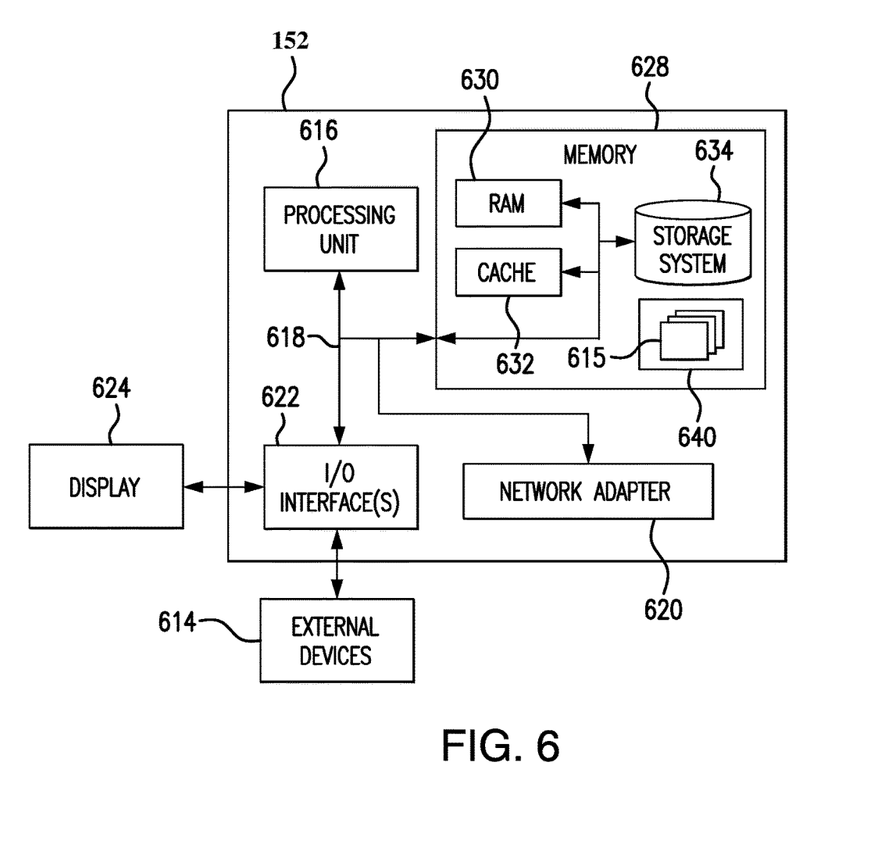
FIG. 6 illustrates internal and external components of a quality analyzer device in accordance with illustrative embodiments of the present invention.

Embodiments of media session handovers monitoring framework may be implemented or executed by a centralized non-intrusive quality analyzing system comprising one or more computer servers. One such quality analyzing system 152 is illustrated in FIG. 6. In various embodiments, quality analyzing system 152 may be a server, a workstation, a network computer, a desktop computer, a laptop, or the like.

Quality analyzing system 152 is only one example of a suitable system and is not intended to suggest any limitation as to the scope of use or functionality of embodiments of the invention described herein. Regardless, quality analyzing system 152 is capable of being implemented and/or performing any of the functionality set forth hereinabove.

Quality analyzing system 152 may be described in the general context of computer system-executable instructions, such as program modules, being executed by a computer system. Generally, program modules may include routines, programs, objects, components, logic, data structures, and so on that perform particular tasks or implement particular abstract data types. Quality analyzing system 152 may be practiced in distributed data processing environments where tasks are performed by remote processing devices that are linked through a communications network. In a distributed data processing environment, program modules may be located in both local and remote computer system storage media including memory storage devices.

Quality analyzing system 152 is shown in FIG. 6 in the form of a general-purpose computing device. The components of quality analyzing system 152 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Quality analyzing system 152 typically includes a variety of computer system readable media. Such media may be any available media that is accessible by quality analyzing system 152, and it includes both volatile and non-volatile media, removable and non-removable media.

System memory 628 can include computer system readable media in the form of volatile memory, such as random access memory (RAM) 630 and/or cache memory 632. Quality analyzing system 152 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 615, such as handover monitor 154, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the invention as described herein.

Quality analyzing system 152 may also communicate with one or more external devices 614 such as a keyboard, a pointing device, a display 624, etc.; one or more devices that enable a user to interact with quality analyzing system 152; and/or any devices (e.g., network card, modem, etc.) that enable quality analyzing system 152 to communicate with one or more other computing devices. Such communication can occur via Input/Output (I/O) interfaces 622. Still yet, quality analyzing system 152 can communicate with one or more networks such as a local area network (LAN), a general wide area network (WAN), and/or a public network (e.g., the Internet) via network adapter 620. As depicted, network adapter 620 communicates with the other components of quality analyzing system 152 via bus 618. It should be understood that although not shown, other hardware and/or software components could be used in conjunction with quality analyzing system 152. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of monitoring, detecting and reporting impact of handovers on quality of experience for one or more users in a mobile cellular network, the method comprising steps of:
    collecting, in a quality analyzing apparatus, from a plurality of coupled mobile network elements, session records specifying data about sessions handled by two or more mobile network elements, wherein each session record comprises a data portion and a media portion and wherein each session comprises two or more session segments;
    identifying, in the quality analyzing apparatus, one or more session segments having one or more session media gaps from the media portions of the collected session records, wherein at least some of the session media gaps are associated with a handover procedure between a first and second mobile network elements and further including classifying a session media gap as media gap associated with the handover procedure in response to determining that a start time of the session media gap is earlier than a start time of a corresponding session segment and classifying a session termination as a call drop caused by the handover procedure, in response to analyzing Session Initiation Protocol (SIP) messages associated with a corresponding session segment;
    calculating and storing, in the quality analyzing apparatus, a plurality of performance metrics related to the handover procedures in the identified session segments; and
    rendering, by the quality analyzing apparatus, to a user an interactive graphical representation of the stored performance metrics via a graphical user interface.

2. The method of claim 1, wherein the interactive graphical representation is presented based on user-configurable criteria.

3. The method of claim 2, wherein the interactive graphical representation of the stored performance metrics comprises a vector graphic object having one or more attributes, wherein the vector graphic object is presented over a geographical map representing geolocation of the first and second mobile network elements, wherein the one or more attributes of the vector graphic object are presented based on the user-configurable criteria and wherein direction of vector corresponding to the vector graphic object represents handover from the first network element to the second network element.

4. The method of claim 1, wherein the first mobile network element comprises a first Evolved Node B (eNodeB), a first Node B or a first Base Transceiver Station (BTS) and wherein the second network element comprises a second eNodeB, a second Node B or a second BTS.

5. The method of claim 1, wherein the start time of the corresponding session segment is determined based on a timestamp of a first packet received by the second mobile network element.

6. The method of claim 1, wherein the step of classifying the session media gap further comprises classifying the session termination as a call drop caused by the handover procedure, further in response to determining that the session termination occurred within a predefined time period of the media gap associated with the handover procedure.

7. The method of claim 1, wherein the plurality of performance metrics comprises a handover gap count metric, handover gap size metrics, a handover gap length metric and a handover gap duration ratio metric, handover gap per handovers metric, a handover gaps per minute metric, a handover gap to total gap ratio metric.

\* \* \* \* \*